(12) United States Patent  (10) Patent No.: US 11,659,571 B2
Jiang et al.  (45) Date of Patent: May 23, 2023

(54) RESOURCE INFORMATION TRANSMISSION METHOD, RELEVANT DEVICE AND SYSTEM

(71) Applicant: VIVO MOBILE COMMUNICATION CO., LTD., Chang'an Dongguan (CN)

(72) Inventors: Dajie Jiang, Chang'an Dongguan (CN); Xueming Pan, Chang'an Dongguan (CN); Fei Qin, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 218 days.

(21) Appl. No.: 16/627,207

(22) PCT Filed: May 2, 2018

(86) PCT No.: PCT/CN2018/085350
§ 371 (c)(1),
(2) Date: Apr. 10, 2020

(87) PCT Pub. No.: WO2019/001135
PCT Pub. Date: Jan. 3, 2019

(65) Prior Publication Data
US 2020/0187201 A1 Jun. 11, 2020

(30) Foreign Application Priority Data
Jun. 30, 2017 (CN) .......................... 201710527467.5

(51) Int. Cl.
*H04W 72/00* (2023.01)
*H04W 72/29* (2023.01)
(Continued)

(52) U.S. Cl.
CPC ....... *H04W 72/29* (2023.01); *H04W 72/0446* (2013.01); *H04W 72/0453* (2013.01); *H04W 72/27* (2023.01); *H04W 72/569* (2023.01)

(58) Field of Classification Search
CPC ......... H04W 72/0433; H04W 72/0426; H04W 72/0446; H04W 72/0453; H04W 72/1242
See application file for complete search history.

(56) References Cited

U.S. PATENT DOCUMENTS 9,949,297 B2 * 4/2018 Uemura ................. H04W 76/27
2010/0034163 A1 2/2010 Damnjanovic et al.
(Continued)

FOREIGN PATENT DOCUMENTS

CN 102771171 A 11/2012
CN 102932950 A 2/2013
(Continued)

OTHER PUBLICATIONS

First Chinese Office Action Application No. 201710527467.5; dated Nov. 28, 2019.
(Continued)

*Primary Examiner* — Rhonda L Murphy
(74) *Attorney, Agent, or Firm* — von Briesen & Roper, s.c.

(57) ABSTRACT

A resource information transmission method, a relevant device and a system are provided. The resource information transmission method includes: acquiring resource information from a second network side device or a central control unit, the resource information being used to represent a frequency-domain resource for the second network side device or the first network side device; and performing communication transmission with a UE in accordance with the resource information.

16 Claims, 8 Drawing Sheets

(51) Int. Cl.
*H04W 72/0446* (2023.01)
*H04W 72/0453* (2023.01)
*H04W 72/27* (2023.01)
*H04W 72/566* (2023.01)

(56) References Cited

U.S. PATENT DOCUMENTS

| | | |
|---|---|---|
| 2011/0199944 A1 | 8/2011 | Chen et al. |
| 2014/0023004 A1 | 1/2014 | Kumar et al. |
| 2015/0036566 A1* | 2/2015 | Blankenship ....... H04W 52/367 370/311 |
| 2016/0007406 A1 | 1/2016 | Yi et al. |
| 2016/0105905 A1 | 4/2016 | Vajapeyam et al. |
| 2016/0192379 A1 | 6/2016 | Behravan et al. |
| 2016/0219557 A1 | 7/2016 | He et al. |
| 2016/0302209 A1 | 10/2016 | Behravan et al. |
| 2016/0302218 A1 | 10/2016 | Behravan et al. |
| 2017/0245278 A1* | 8/2017 | Xue ................. H04W 72/0453 |
| 2017/0295499 A1 | 10/2017 | Guo et al. |
| 2018/0092085 A1* | 3/2018 | Shaheen ........... H04W 36/0022 |
| 2018/0332603 A1 | 11/2018 | Takeda et al. |
| 2020/0154496 A1* | 5/2020 | Yi ......................... H04W 76/15 |

FOREIGN PATENT DOCUMENTS

| | | |
|---|---|---|
| CN | 103200653 A | 7/2013 |
| CN | 104488206 A | 4/2015 |
| CN | 102612849 8 | 8/2015 |
| CN | 106535269 A | 3/2017 |
| CN | 106797646 A | 5/2017 |
| CN | 101783717 A | 7/2020 |
| EP | 3139658 A1 | 3/2017 |
| WO | WO 2010/124444 A1 | 11/2010 |
| WO | WO 2016/101270 A1 | 6/2015 |
| WO | WO 2016/121307 A1 | 8/2016 |
| WO | WO2017/038563 A1 | 3/2017 |

OTHER PUBLICATIONS

Second Chinese Office Action Application No. 201710527467.5; dated Mar. 9, 2020.
Chinese Search Report Application No. 201710527467.5; dated Apr. 17, 2019.
European Search Report Application No. 18822968.6; dated May 29, 2020.
Internationat Search Report & Written: Opinion related to Application No. PCT/CN2018/085350; dated Jul. 12, 2018.
Extended European Search Report related to Application No. 18828695.9 dated May 12, 2020.
International Search Report related to Application No. PCT/CN2018/094636 dated Sep. 13, 2018.
Chinese Search Report related to Application No. 201710543348.9 dated Apr. 16, 2019.

* cited by examiner

RESOURCE INFORMATION TRANSMISSION METHOD, RELEVANT DEVICE AND SYSTEM

CROSS-REFERENCE TO RELATED APPLICATION

This patent application is a 35 USC § 371 U.S. national stage of International Application No. PCT/CN2018/1085350 filed on May 2, 2018, which claims priority of the Chinese Patent Application No. 201710527467,5 filed on Jun. 30, 2017, which is incorporated herein by reference in its entirety.

TECHNICAL FIELD

The present disclosure relates to the field of communication technology, in particular to a resource information transmission method, a relevant device, and a system.

BACKGROUND

There probably exists such a communication scenario where communication systems are tightly coupled to each other in a Dual Connectivity (DC) mode. In this scenario, two systems may be coupled to each other in the DC mode, e.g., a Long Term Evolution (LTE) system may be coupled to a $5^{th}$-Generation (5G) system in the DC mode. In addition, in the communication scenario where the tight coupling is provided in the DC mode, a User Equipment (UE) may access to two network side devices, and may communicate with the two network side devices simultaneously or not simultaneously. When the UE communicates with the two network side devices simultaneously, the communication performance of the UE may probably be adversely affected, e.g., due to intra-UE interference. Hence, there is an urgent need to improve the communication performance of the UE.

SUMMARY

An object of the present disclosure is to provide a resource information transmission method, a relevant device, and a system, so as to improve the communication performance of the UE.

In one aspect, the present disclosure provides in some embodiments a resource information transmission method for a first network side device, including: acquiring resource information from a second network side device or a central control unit, the resource information being used to represent a frequency-domain resource for the second network side device or the first network side device; and performing communication transmission with a UE in accordance with the resource information.

In another aspect, the present disclosure provides in some embodiments a resource information transmission method for a second network side device, including transmitting resource information to a first network side device, so that the first network side device performs communication transmission with a UE in accordance with the resource information. The resource information is used to represent a frequency-domain resource for the second network side device.

In yet another aspect, the present disclosure provides in some embodiments a resource information transmission method for a central control unit, including: transmitting first resource information to a first network side device, so that the first network side device performs communication transmission with a UE in accordance with the first resource information, the first resource information being used to represent a frequency-domain resource for the first network side device; and transmitting second resource information to a second network side device, so that the second network side device performs communication transmission with the UE in accordance with the second resource information, the second resource information being used to represent a frequency-domain resource for the second network side device.

In still yet another aspect, the present disclosure provides in some embodiments a network side device which is a first network side device, including: an acquisition module configured to acquire resource information from a second network side device or a central control unit, the resource information being used to represent a frequency-domain resource for the second network side device or the first network side device; and a transmission module configured to perform communication transmission with a UE in accordance with the resource information.

In still yet another aspect, the present disclosure provides in some embodiments a network side device which is a second network side device, including a transmission module configured to transmit resource information to a first network side device, so that the first network side device performs communication transmission with a UE in accordance with the resource information. The resource information is used to represent a frequency-domain resource for the second network side device.

In still yet another aspect, the present disclosure provides in some embodiments a central control unit, including: a first transmission module configured to transmit first resource information to a first network side device, so that the first network side device performs communication transmission with a UE in accordance with the first resource information, the first resource information being used to represent a frequency-domain resource for the first network side device; and a second transmission module configured to transmit second resource information to a second network side device, so that the second network side device performs communication transmission with the UE in accordance with the second resource information, the second resource information being used to represent a frequency-domain resource for the second network side device.

In still yet another aspect, the present disclosure provides in some embodiments a network side device which is a first network side device, including a processor, a memory, a transceiver and a user interface. The processor, the memory, the transceiver and the user interface are coupled together via a bus system. The processor is configured to read a program stored in the memory so as to implement the above-mentioned resource information transmission method for the first network side device.

In still yet another aspect, the present disclosure provides in some embodiments a network side device which is a second network side device, including a processor, a memory, a transceiver and a user interface. The processor, the memory, the transceiver and the user interface are coupled together via a bus system. The processor is configured to read a program stored in the memory so as to implement the above-mentioned resource information transmission method for the second network side device.

In still yet another aspect, the present disclosure provides in some embodiments a central control unit, including a processor, a memory, a transceiver and a user interface. The processor, the memory, the transceiver and the user interface are coupled together via a bus system. The processor is configured to read a program stored in the memory so as to implement the above-mentioned resource information transmission method for the central control unit.

In still yet another aspect, the present disclosure provides in some embodiments a resource information transmission system, including the above-mentioned first network side device and second network side device, or the above-mentioned first network side device and central control unit.

In still yet another aspect, the present disclosure provides in some embodiments a computer-readable storage medium storing therein a resource information transmission program. The resource information transmission program is executed by a processor so as to implement the above-mentioned resource information transmission method for the first network side device.

In still yet another aspect, the present disclosure provides in some embodiments a computer-readable storage medium storing therein a resource information transmission program. The resource information transmission program is executed by a processor so as to implement the above-mentioned resource information transmission method for the second network side device.

In still yet another aspect, the present disclosure provides in some embodiments a computer-readable storage medium storing therein a resource information transmission program. The resource information transmission program is executed by a processor so as to implement the above-mentioned resource information transmission method for the central control unit.

According to the embodiments of the present disclosure, through resource coordination between the first network side device and the second network side device, it is able to reduce an interference for the UE, thereby to improve the communication performance of the UE.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure. The expression "and/or" involved in the embodiments of the present disclosure represents at least one of listed items.

Figure 1:
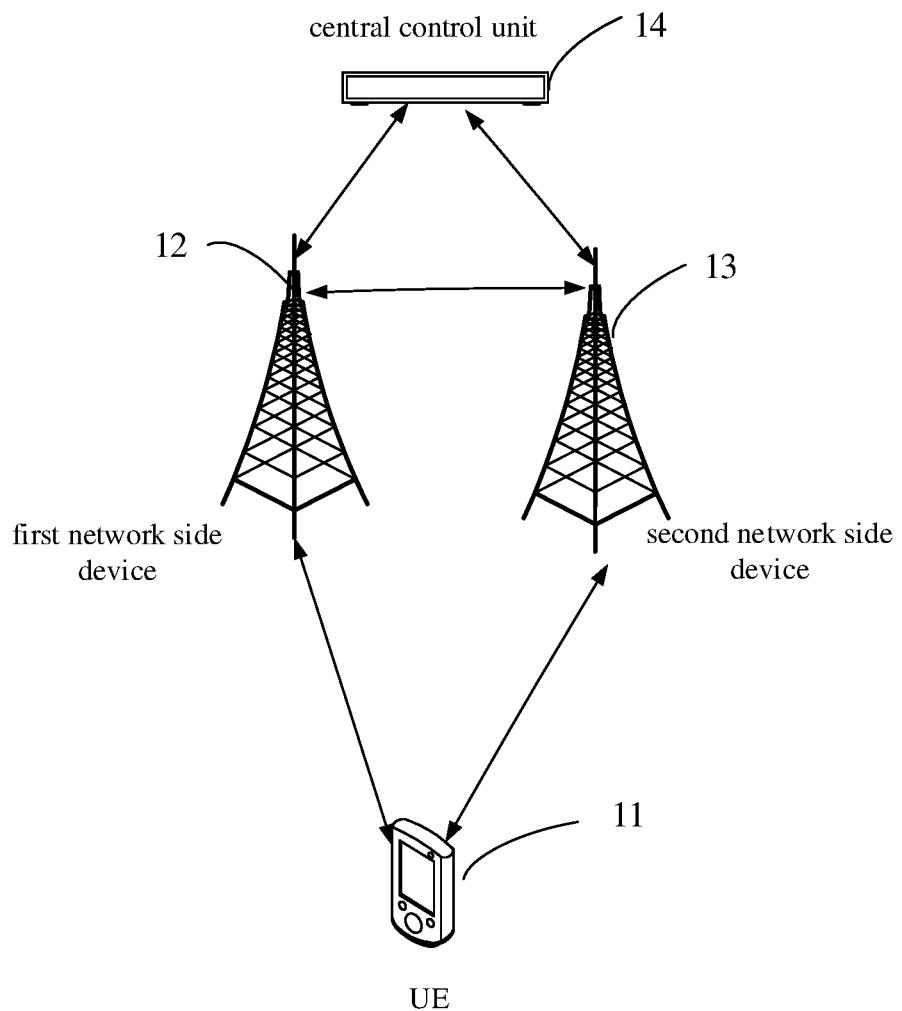
FIG. 1 is a schematic view showing an available network system according to one embodiment of the present disclosure.

The present disclosure provides an available network system which, as shown in FIG. 1, includes a UE 11, a first network side device 12, a second network side device 13 and a central control unit 14. The UE 11 may be a mobile phone, a tablet personal computer, a laptop computer, a Personal Digital Assistant (PDA), a Mobile Internet Device (MID) or a wearable device. It should be appreciated that, the type of the UE 11 will not be particularly defined herein. The UE 11 may communication with the first network side device 12 and the second network side device 13 simultaneously. The first network side device 12 may be a network side device in a first system, e.g., a base station in the first system, and the base station may be a macro base station, e.g., an evolved Node B (eNB) in an LTE system or a gNB in a 5G New Radio (NR) system. In addition, the first network side device 12 may also be an Access Point (AP). The second network side device 13 may be a network side device in a second system, e.g., a base station in the second system, and the base station may be a macro base station, e.g., the eNB in the LTE system or the gNB in the 5G NR system. It should be appreciated that, the types of the first network side device 12 and the second network side device 13 will not be particularly defined herein. In addition, the first system may be the LTE system while the second system may be the 5G NR system, or the first system may be the 5G NR system while the second system may be the LTE system. In some embodiments of the present disclosure, the first system and the second system may be tightly coupled with each other in a Dual Connectivity (DC) mode. One of the two system may serve as a Master Node (MN), and the other may serve as a Secondary Node (SN). In a DC system, two cell groups, i.e., a Master Cell Group (MCG) and a Secondary Cell Group (SCG), may be provided. The MCG may include a Primary Cell (PCell) and one or more Secondary Cell (SCell). The SCG may include one Primary Secondary Cell (PSCell) and one or more SCells. The central control unit 14 may be deployed in the first network side device, the second network side device or any other network node, which will not be particularly defined herein.

In the above network system, data transmission may be performed between the UE 11 and the first network side device 12 as well as the second network side device 13 simultaneously, or at different time points, which will not be particularly defined herein.

Figure 2:
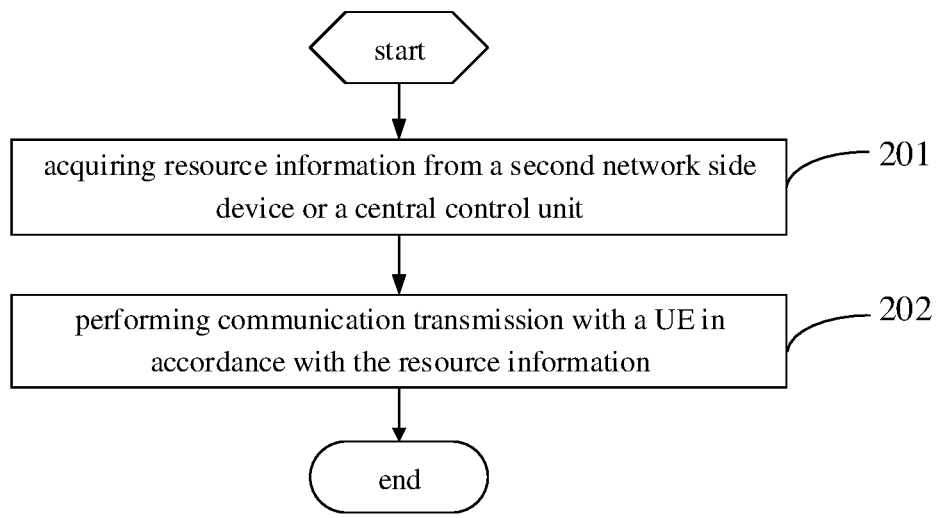
FIG. 2 is a flow chart of a resource information transmission method according to one embodiment of the present disclosure.

The present disclosure provides in some embodiments a resource information transmission method for a first network side device which, as shown in FIG. 2, includes the following steps.

Step 201: acquiring resource information from a second network side device or a central control unit, the resource information being used to represent a frequency-domain resource for the second network side device or the first network side device.

A carrier frequency for the second network side device may be a frequency-domain resource to be scheduled by the second network side device, e.g., a frequency-domain resource or a time-frequency-domain resource. In this way, the first network side device may perform the information delivery in accordance with the frequency-domain resource to be scheduled by the second network side device, so as to prevent the occurrence of an intra-UE interference for a UE.

The frequency-domain resource for the first network side device may be allocated by the central control unit. The central control unit may configure the frequency-domain resource so as to prevent the occurrence of the intra-UE interference for the UE. In other words, when the first network side device performs the information delivery on the frequency-domain resource, it is able to prevent the occurrence of the intra-UE interference for the UE.

It should be appreciated that, in the embodiments of the present disclosure, the frequency-domain resource may be a frequency-domain resource without any time information, or a frequency-domain resource with time information, i.e., a time-frequency-domain resource.

In the embodiments of the present disclosure, the intra-UE interference may refer to an interference caused by a signal transmitted by the UE itself on a signal received by the UE itself, e.g., an interference caused by an uplink signal transmitted by the UE on a downlink signal received by the UE. In addition, the intra-UE interference may include, but not limited to, intermodulation interference, harmonic interference or harmonic combination interference. The harmonic interference may be a secondary harmonic interference or any other high-order harmonic interference, and the intermodulation interference may be a secondary intermodulation interference or any other high-order intermodulation interference, which will not be particularly defined herein.

Figure 3:
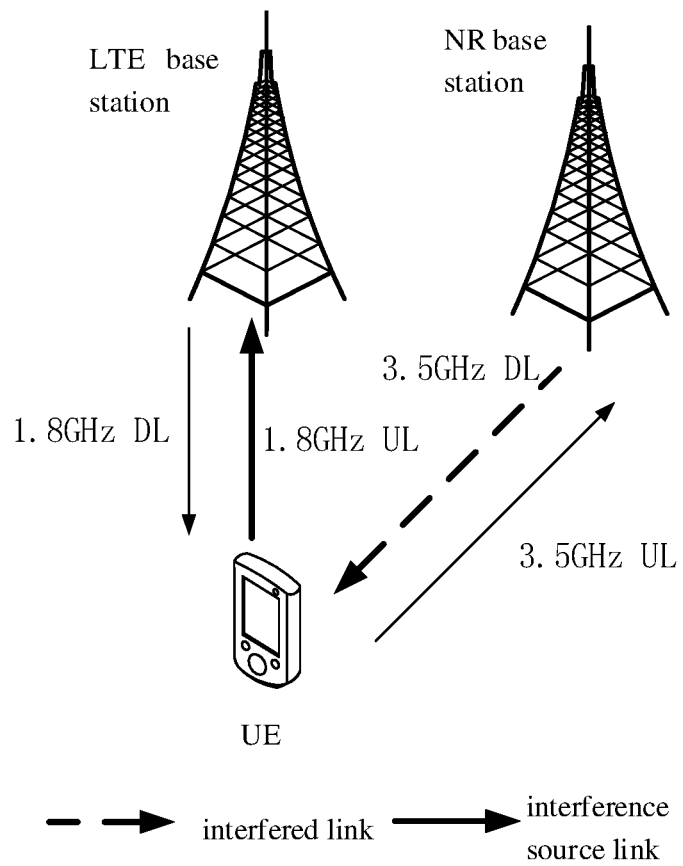
FIG. 3 is a schematic view showing a transmission situation according to one embodiment of the present disclosure.

For example, when the first network side device is a network side device in the LTE system, the second network side device is a network side device in the 5G NR system, and the LTE system and the 5G NR system are coupled in the DC mode using an LTE Frequency Division Duplexing (FDD) frequency of 1.8 GHz and an NR Time Division Duplexing (TDD) frequency of 3.5 GHz, as shown in FIG. 3, the UE may communicate with an LTE base station and an NR base station, i.e., the UE may transmit an uplink signal to the LTE base station at the frequency of 1.8 GHz and receive a downlink signal from the 5G NR base station at the frequency of 3.5 GHz. In this regard, the intra-UE interference may be caused by the uplink signal on the downlink signal, i.e., the uplink signal may be an interference source link, while the downlink signal may be an interfered link.

Figure 4:
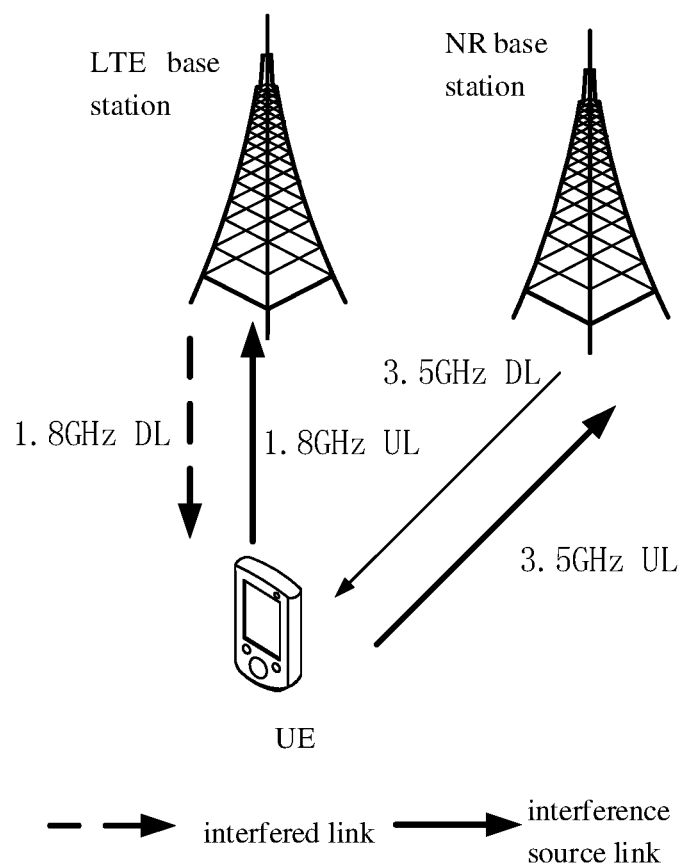
FIG. 4 is another schematic view showing the transmission situation according to one embodiment of the present disclosure.

For another example, when the first network side device is a network side device in the LTE system, the second network side device is a network side device in the 5G NR system, and the LTE system and the 5G NR system are coupled in the DC mode using an LTE FDD frequency of 1.8 GHz and an NR TDD frequency of 3.5 GHz, as shown in FIG. 4, the UE may communicate with the LTE base station and the NR base station, i.e., the UE may transmit an uplink signal to the LTE base station at the frequency of 1.8 GHz, and meanwhile transmit an uplink signal to the NR base substrate at the frequency of 3.5 GHz and receive a downlink signal from the LTE base station at the frequency of 1.8 GHz. In this regard, the intra-UE interference may be caused by each of the two uplink signals on the downlink signal, i.e., each of the two uplink signals may be an interference source link, while the downlink signal may be an interfered link.

Step 202: performing communication transmission with the UE in accordance with the resource information.

In this step, the first network side device may perform the communication transmission with one or more UEs, or with one or more UEs in one or more cells in accordance with the resource information. In other words, the resource information may be resource information at a UE level or at a cell level.

Through the above steps, it is able to achieve the interaction of the resource information between the first network side device and the second network side device, thereby to reduce or prevent the occurrence of the intra-UE interference for the UE. In addition, it is able to achieve the interaction of the resource information between the first network side device and the central control unit, thereby to reduce or prevent the occurrence of the intra-UE interference for the UE. For example, in Step 202, the first network side device may perform the communication transmission with the UE on a frequency-domain resource of the frequency-domain resources for the second network side device, which is without any intra-UE interference. Alternatively, when uplink transmission is currently being performed between the second network side device (e.g., the network side device in the LTE system) and the UE, no downlink transmission may be performed between the first network side device and the UE in Step 202, or when the uplink transmission is currently being performed between the second network side device (e.g., the network side device in the 5G NR system) and the UE, the uplink transmission and the downlink transmission may not be performed by the first network side device simultaneously.

In the embodiments of the present disclosure, through resource coordination between the first network side device and the second network side device, it is able to reduce the interference for the UE, thereby to improve the communication performance of the UE.

Figure 5:
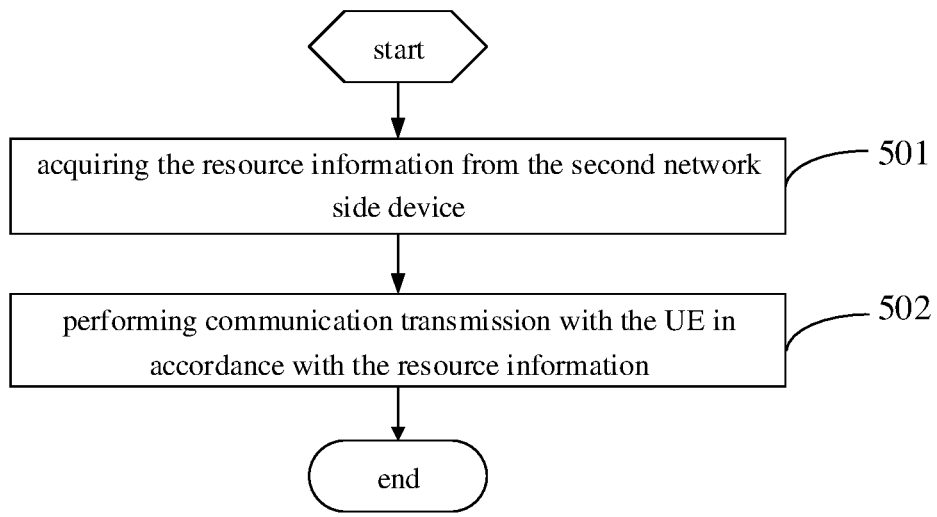
FIG. 5 is a flow chart showing the resource information transmission method according to one embodiment of the present disclosure.

As shown in FIG. 5, the present disclosure further provides in some embodiments a resource information transmission method for a first network side device, which differs from that in FIG. 2 mainly in that the resource information is transmitted by the second network side device. As shown in FIG. 5, the resource information transmission method may include the following steps.

Step 501: acquiring the resource information from the second network side device, the resource information being used to represent a frequency-domain resource for the second network side device.

In a possible embodiment of the present disclosure, the resource information may be used to represent at least one of: a frequency-domain resource for uplink transmission and/or downlink transmission to be scheduled by the second network side device for a target UE or a target cell; a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the second network side device for the target UE or the target cell; a scheduling priority level of a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located; a time-frequency-domain resource occupied by a significant uplink signal and/or a significant uplink channel for the second network side device, the time-frequency-domain resource including a frequency-domain resource and a time-domain resource where the frequency-domain resource is located; and a time-frequency-domain resource occupied by a significant downlink signal and/or a significant downlink channel for the second network side device, the time-frequency-domain resource including a frequency-domain resource and a time-domain resource where the frequency-domain resource is located.

The frequency-domain resource for the uplink transmission and/or the downlink transmission to be scheduled by the second network side device for the target UE or the target cell may be a frequency-domain resource for the uplink transmission and/or the downlink transmission to be scheduled by the second network side device for the target UE or the target cell within a predetermined time period. The time-frequency-domain resource for the uplink transmission and/or the downlink transmission to be scheduled by the second network side device for the target UE or the target cell may be a time-frequency-domain resource for the uplink transmission and/or the downlink transmission to be scheduled by the second network side device for the target UE or the target cell within a predetermined time period.

In addition, the frequency-domain resource represented by the resource information may include one or more of a Physical Resource Block (PRB), a bandwidth part, a PRB group, a subcarrier, a system bandwidth of a component carrier, and a central frequency point.

In this regard, it is able to enrich reference resources when the communication transmission is performed between the first network side device and the UE, thereby to prevent the occurrence of the intra-UE interference for the UE. In addition, the resource information may also be used to represent a serial number of the subcarrier, bandwidth information about the subcarrier, or any other information, which will not be particularly defined herein.

For example, the resource information may be used to represent PRB index, a system bandwidth and a central frequency point to be scheduled by the second network side device within a subsequent time period of 200 ms, i.e., the PRB index to be scheduled within the subsequent time period of 200 ms may be 10 to 20, the system bandwidth may be 20 MHz and the central frequency point may be 1800 MHz.

The scheduling priority level of the frequency-domain resource may be a priority level of each frequency-domain resource, and the scheduling priority level of the time-frequency-domain resource may be a priority level of each time-frequency-domain resource. For example, the resource information may be used to represent the PRB index to be scheduled by the second network side device whose priority levels are ranked in a descending order within the subsequent time period of 200 ms, the system bandwidth and the central frequency point, i.e., the PRB index to be scheduled within the subsequent time period of 200 ms may be 100 to 1, the system bandwidth may be 20 MHz and the central frequency point may be 1800 MHz.

The transmission power, the transmission power range, the transmission power spectrum density or the transmission power spectrum density range corresponding to the frequency-domain resource may be transmission power, a transmission power range, a transmission power spectrum density or a transmission power spectrum density range used when the second network side device performs the communication transmission on the frequency-domain resource. Identically, the transmission power, the transmission power range, the transmission power spectrum density or the transmission power spectrum density range corresponding to the time-frequency-domain resource may be transmission power, a transmission power range, a transmission power spectrum density or a transmission power spectrum density range used when the second network side device performs the communication transmission on the time-frequency-domain resource. For example, the resource information may be used to represent the PRB index to be scheduled by the second network side device within the subsequent time period of 200 ms, the system bandwidth and the central frequency point, i.e., the PRB index to be scheduled within the subsequent time period of 200 ms may be 10 to 20, the transmission power range may be 5 dBm to 10 dBm, the system bandwidth may be 20 MHz and the central frequency point may be 1800 MHz.

The significant uplink signal may include an uplink reference signal, e.g., a Sounding Reference Signal (SRS), a Common Reference Signal (CRS) or a Positioning Reference Signal (PRS). Of course, apart from the reference signal, the significant uplink signal may also include an uplink signal defined by the second network side device, or defined by the second network side device through negotiation, which will not be particularly defined herein. In addition, the significant uplink signal may also be an uplink signal for a Multicast Broadcast Single Frequency Network (MBSFN).

The significant uplink channel may include one or more of an uplink control channel and a Physical Random Access Channel (PRACH). The uplink control channel may include a Physical Uplink Control Channel (PUCCH) or any other uplink control channel, which will not be particularly defined herein.

The significant downlink signal may include one or more of a synchronization signal, a paging signal and a downlink reference signal.

The synchronization signal may include a Primary Synchronization Signal (PSS) and/or a Secondary Synchronization Signal (SSS). The downlink reference signal may include a Channel State Information Reference Signal (CSI-RS) or a Demodulation Reference Signal (DMRS). Alternatively, the significant downlink signal may also include a downlink signal defined by the second network side device, or defined by the second network side device through negotiation, which will not be particularly defined herein. In addition, the significant downlink signal may also be a downlink signal for the MBSFN.

The significant downlink channel may include one or more of a broadcast channel, a downlink control channel, a downlink shared channel, a Physical Hybrid Automatic Repeat-reQuest Indicator Channel (PHICH) and a Physical Control Format Indicator Channel (PCFICH).

The broadcast channel may include a Physical Broadcast Channel (PBCH), the downlink control channel may be a Physical Downlink Control Channel (PDCCH), and the downlink shared channel may be a Physical Downlink Shared Channel (PDSCH).

During the implementation, the frequency-domain resource to be scheduled by the second network side device may be represented by the resource information, so it is able for the first network side device to accurately determine a transmission resource on which the intra-UE interference is probably caused, thereby to reduce or prevent the occurrence of the intra-UE interference for the UE.

Step 502: performing communication transmission with the UE in accordance with the resource information.

Step 502 may include, when uplink transmission is performed between the second network side device and the UE, not performing, by the first network side device, downlink transmission with the UE, or not performing, by the first network side device, the uplink transmission and the downlink transmission simultaneously.

In a possible embodiment of the present disclosure, the performing the communication transmission with the UE in accordance with the resource information may include: determining a first transmission resource for the target UE probably influenced by the intra-UE interference in accordance with the resource information, and scheduling a transmission resource other than the first transmission resource preferentially so as to perform the communication transmission with the UE; or determining a second transmission resource for a UE in the target cell probably influenced by the intra-UE interference in accordance with the resource information, and scheduling a transmission resource other than the second transmission resource preferentially so as to perform the communication transmission with the UE in the target cell.

The determining the first transmission resource for the target UE probably influenced by the intra-UE interference may include determining frequency point information about the target UE probably influenced by the intra-UE interference. For example, the frequency point information about the target UE probably influenced by such intra-UE interference as intermodulation interference or secondary harmonic interference may be determined as follows. When the UE accesses to the LTE system and the NR system in a DC mode, an LTE uplink frequency point is 1720 MHz to 1740 MHz, and a 5G NR uplink frequency point is 3485 MHz to 3525 MHz, a frequency point range for the UE probably influenced by the intermodulation interference may be an LTE downlink frequency point, i.e., 1745 MHz to 1805 MHz. Then, in combination with the LTE system bandwidth and the central frequency point at a network side (e.g., the LTE system bandwidth is 1765 MHz to 1775 MHz), the frequency point for the UE probably influenced by the intermodulation interference may be 1765 MHz to 1775 MHz. For another example, when the LTE uplink frequency point is 1720 MHz to 1740 MHz, a frequency point for the UE probably influenced by the secondary harmonic interference may be a 5G downlink frequency point, i.e., 3440 MHz to 3480 MHz. Then, in combination with the NR system bandwidth and the central frequency point at the network side (e.g., the NR system bandwidth is 3460 MHz to 3500 MHz), the frequency point for the UE probably influenced by the secondary harmonic interference may be 3460 MHz to 3480 MHz.

Identically, the second transmission resource for the UE in the target cell probably influenced by the intra-UE interference may be determined.

In the embodiments of the present disclosure, it is able to preferentially schedule the transmission resource other than the transmission resource probably influenced by the intra-UE interference so as to perform the communication transmission with the UE in the target cell, thereby to prevent the intra-UE interference.

In a possible embodiment of the present disclosure, the first transmission resource may include one or more of a PRB, a bandwidth part, a PRB group, a subcarrier, a system bandwidth of a component carrier, and a central frequency point. The second transmission resource may include one or more of a PRB, a bandwidth part, a PRB group, a subcarrier, a system bandwidth of a component carrier, and a central frequency point.

Through the first transmission resource and the second transmission resource, it is able for the first network side device to accurately schedule the resource not influenced by the intra-UE interference for the transmission, thereby to improve the communication performance of a communication system.

It should be appreciated that, in the embodiments of the present disclosure, Step 302 may further include performing the communication transmission with the UE in accordance with the resource information through a transmission resource adjacent to the time-frequency-domain resource represented by the resource information, or through a transmission resource other than the time-frequency-domain resource represented by the resource information, which will not be particularly defined herein.

According to the embodiments of the present disclosure, through the above steps, it is able for the first network side device to perform the communication transmission with the UE in accordance with the transmission resource to be scheduled by the second network side device, thereby to prevent the intra-UE interference for the UE.

Figure 6:
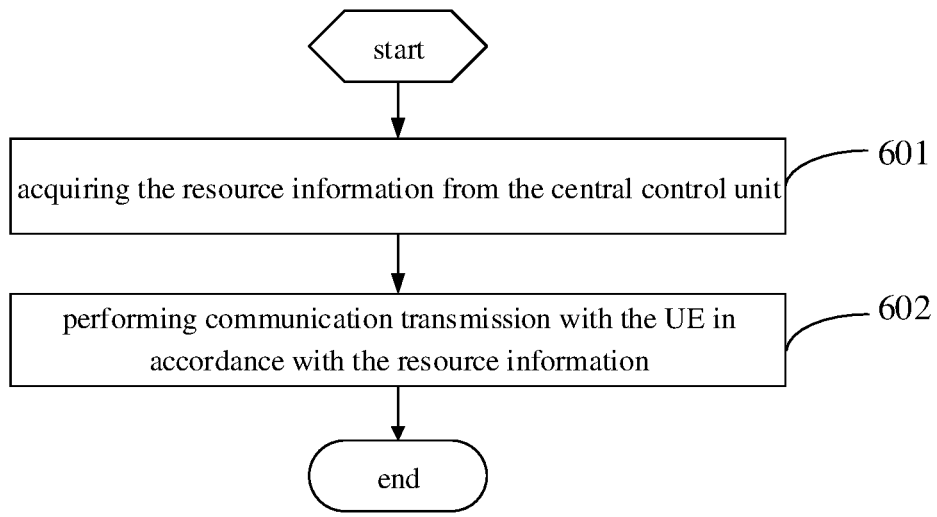
FIG. 6 is another flow chart showing the resource information transmission method according to one embodiment of the present disclosure.

As shown in FIG. 6, the present disclosure further provides in some embodiments a resource information transmission method for a first network side device. The resource information transmission method in FIG. 6 differs from that in FIG. 2 mainly in that the resource information is received by the first network side device from the central control unit. As shown in FIG. 6, the resource information transmission method may include the following steps.

Step 601: acquiring the resource information from the central control unit, the resource information being used to represent the frequency-domain resource for the first network side device.

In a possible embodiment of the present disclosure, the resource information may be used to represent at least one of: a frequency-domain resource for uplink transmission and/or downlink transmission to be scheduled by the first network side device for a target UE or a target cell; a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the first network side device for the target UE or the target cell; a scheduling priority level of a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located.

The description about the frequency-domain resource represented by the resource information may refer to that mentioned in the above embodiment as shown in FIG. 3 with a same beneficial effect, and thus will not be particularly defined herein.

In a possible embodiment of the present disclosure, the resource represented by the resource information may be a resource configured by the central control unit to prevent the occurrence of the intra-UE interference for the target UE or the UE in the target cell. For example, the central control unit may configure the resources capable of preventing the occurrence of the intra-UE interference for the first network side device and the second network side device, i.e., when the first network side device performs the transmission with the UE through a corresponding transmission resource and the second network side device performs the transmission with the UE through a corresponding transmission resource, no intra-UE interference may occur for the UE.

For example, the resource information may be used to represent PRB index to be scheduled by the first network side device within a subsequent time period of 200 ms, a system bandwidth and a central frequency point, i.e., the PRB index to be scheduled within the subsequent time period of 200 ms may be 11 to 20. The resource information transmitted from the central control unit to the second network side device may be used to represent PRB index to be scheduled by the second network side device within the subsequent time period of 200 ms, a system bandwidth and a central frequency point, i.e., the PRB index to be scheduled within the subsequent time period of 200 ms may be 1 to 10.

For another example, the resource information may be used to represent the PRB index to be scheduled by the first network side device whose priority levels are ranked in a descending order within the subsequent time period of 200 ms (e.g., 100 to 1), and the resource information transmitted from the central control unit to the second network side device may be used to represent the PRB index to be scheduled by the second network side device whose priority levels are ranked in a descending order within the subsequent time period of 200 ms (e.g., 1 to 100).

For yet another example, the resource information may be used to represent the PRB index to be scheduled by the first network side device within the subsequent time period of 200 ms (11 to 20) and the transmission power range (5 dBm to 10 dBm), and the resource information transmitted from the central control unit to the second network side device may be used to represent the PRB index to be scheduled by the second network side device within the subsequent time period of 200 ms (1 to 10) and the transmission power range (5 dBm to 10 dBm).

In a possible embodiment of the present disclosure, the frequency-domain resource represented by the resource information may include one or more of a PRB, a bandwidth part, a PRB group, a subcarrier, a system bandwidth of a component carrier, and a central frequency point.

The description about the frequency-domain resource may refer to that mentioned in the above embodiment as shown in FIG. 3 with a same beneficial effect, and thus will not be particularly defined herein.

Step 602: performing communication transmission with the UE in accordance with the resource information.

In a possible embodiment of the present disclosure, the performing the communication transmission with the UE in accordance with the resource information may include performing the communication transmission with the target UE or the UE in the target cell through the resource represented by the resource information.

During the implementation, it is able for the first network side device to perform the communication transmission with the target UE or the UE in the target cell through the resource configured by the central control unit, thereby to prevent the occurrence of the intra-UE interference for the UE.

According to the embodiments of the present disclosure, through the above steps, it is able for the first network side device to perform the communication transmission with the UE through the frequency-resource configured by the central control unit, thereby to prevent the occurrence of the intra-UE interference for the UE.

Figure 7:
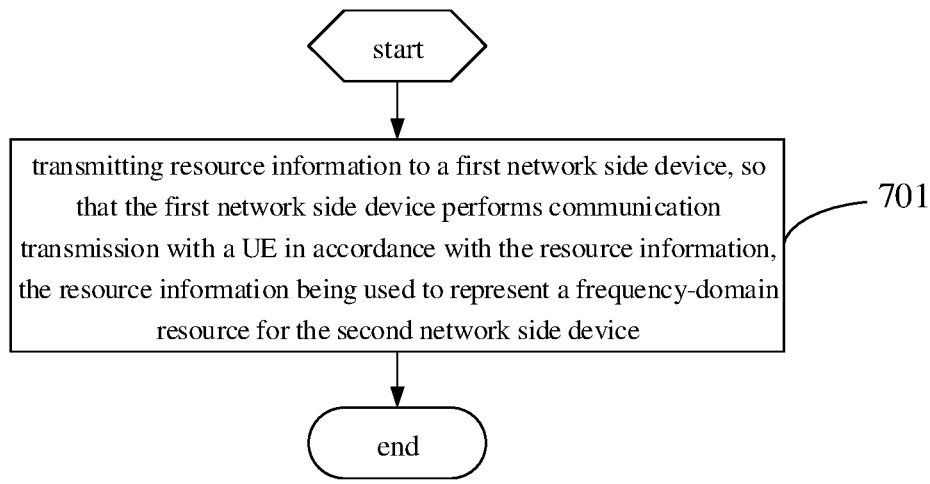
FIG. 7 is yet another flow chart of a resource information transmission method according to one embodiment of the present disclosure.

The present disclosure further provides in some embodiments a resource information transmission method for a second network side device which, as shown in FIG. 7, includes Step 701 of transmitting resource information to a first network side device, so that the first network side device performs communication transmission with a UE in accordance with the resource information. The resource information may be used to represent a frequency-domain resource for the second network side device.

In a possible embodiment of the present disclosure, the resource information may be used to represent at least one of: a frequency-domain resource for uplink transmission and/or downlink transmission to be scheduled by the second network side device for a target UE or a target cell; a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the second network side device for the target UE or the target cell; a scheduling priority level of a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located; a time-frequency-domain resource occupied by a significant uplink signal and/or a significant uplink channel for the second network side device, the time-frequency-domain resource including a frequency-domain resource and a time-domain resource where the frequency-domain resource is located; and a time-frequency-domain resource occupied by a significant downlink signal and/or a significant downlink channel for the second network side device, the time-frequency-domain resource including a frequency-domain resource and a time-domain resource where the frequency-domain resource is located.

In a possible embodiment of the present disclosure, the frequency-domain resource represented by the resource information may include one or more of a PRB, a bandwidth part, a PRB group, a subcarrier, a system bandwidth of a component carrier, and a central frequency point.

In a possible embodiment of the present disclosure, the significant uplink signal may include an uplink reference signal, the significant uplink channel may include one or more of an uplink control channel and a PRACH, the significant downlink signal may include one or more of a synchronization signal, a paging signal and a downlink reference signal, and the significant downlink channel may include one or more of a broadcast channel, a downlink control channel, a downlink shared channel, a PHICH and a PCFICH.

It should be appreciated that, the implementation of the resource information transmission method may refer to the relevant description about the second network side device in the embodiments as shown in FIGS. 2-5 with a same beneficial effect, and thus will not be particularly defined herein.

Figure 8:
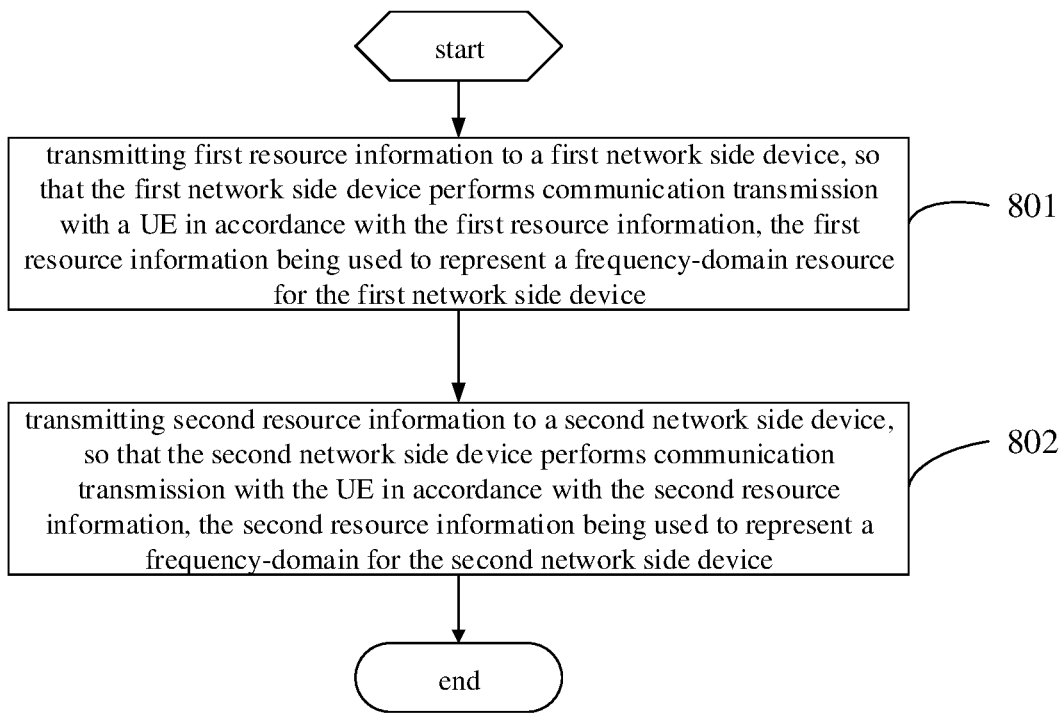
FIG. 8 is still yet another flow chart of a resource information transmission method according to one embodiment of the present disclosure.

The present disclosure further provides in some embodiments a resource information transmission method for a central control unit which, as shown in FIG. 8, includes: Step 801 of transmitting first resource information to a first network side device, so that the first network side device performs communication transmission with a UE in accordance with the first resource information, the first resource information being used to represent a frequency-domain resource for the first network side device; and Step 802 of transmitting second resource information to a second network side device, so that the second network side device performs communication transmission with the UE in accordance with the second resource information, the second resource information being used to represent a frequency-domain resource for the second network side device.

It should be appreciated that, an order of Steps 801 and 802 will not be particularly defined herein. For example, Steps 801 and 802 may be performed simultaneously or one after another, and in FIG. 8, Step 801 is performed at first.

In a possible embodiment of the present disclosure, the first resource information may be used to represent at least one of: a frequency-domain resource for uplink transmission and/or downlink transmission to be scheduled by the first network side device for a target UE or a target cell; a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the first network side device for the target UE or the target cell; a scheduling priority level of a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located.

In a possible embodiment of the present disclosure, the second resource information may be used to represent at least one of: a frequency-domain resource for uplink transmission and/or downlink transmission to be scheduled by the second network side device for a target UE or a target cell; a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the second network side device for the target UE or the target cell; a scheduling priority level of a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located.

In a possible embodiment of the present disclosure, the resource represented by the first resource information may be a resource configured by the central control unit so as to prevent the occurrence of the intra-UE interference for the target UE or the UE in the target cell, and the resource represented by the second resource information may be a resource configured by the central control unit so as to prevent the occurrence of the intra-UE interference for the target UE or the UE in the target cell.

It should be appreciated that, the implementation of the resource information transmission method may refer to the relevant description about the central control unit in the embodiments as shown in FIGS. 2 and 6 with a same beneficial effect, and thus will not be particularly defined herein.

Figure 9:
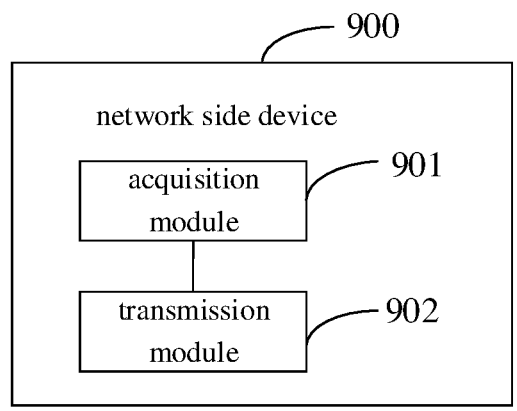
FIG. 9 is a schematic view showing a network side device according to one embodiment of the present disclosure.

As shown in FIG. 9, the present disclosure further provides in some embodiments a network side device which is a first network side device capable of implementing the resource information transmission method in FIGS. 2-6 with a substantially same technical effect. As shown in FIG. 9, the network side device 900 includes: an acquisition module 901 configured to acquire resource information from a second network side device or a central control unit, the resource information being used to represent a frequency-domain resource for the second network side device or the first network side device; and a transmission module 902 configured to perform communication transmission with a UE in accordance with the resource information.

In a possible embodiment of the present disclosure, when the resource information is transmitted by the second network side device, the resource information may be used to represent one or more of: a frequency-domain resource for uplink transmission and/or downlink transmission to be scheduled by the second network side device for a target UE or a target cell; a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the second network side device for the target UE or the target cell; a scheduling priority level of a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located; a time-frequency-domain resource occupied by a significant uplink signal and/or a significant uplink channel for the second network side device, the time-frequency-domain resource including a frequency-domain resource and a time-domain resource where the frequency-domain resource is located; and a time-frequency-domain resource occupied by a significant downlink signal and/or a significant downlink channel for the second network side device, the time-frequency-domain resource including a frequency-domain resource and a time-domain resource where the frequency-domain resource is located.

In a possible embodiment of the present disclosure, the transmission module 902 is further configured to: determine a first transmission resource for the target UE probably influenced by the intra-UE interference in accordance with the resource information, and preferentially schedule a transmission resource other than the first transmission resource so as to perform the communication transmission with the UE; or determine a second transmission resource for the UE in the target cell probably influenced by the intra-UE interference in accordance with the resource information, and preferentially schedule a transmission resource other than the second transmission resource so as to perform the communication transmission with the UE in the target cell.

In a possible embodiment of the present disclosure, the first transmission resource may include one or more of a PRB, a bandwidth part, a PRB group, a subcarrier, a system bandwidth of a component carrier, and a central frequency point, and the second transmission resource may include one or more of a PRB, a bandwidth part, a PRB group, a subcarrier, a system bandwidth of a component carrier, and a central frequency point.

In a possible embodiment of the present disclosure, when the resource information is transmitted by the central control unit, the resource information may be used to represent one or more of: a frequency-domain resource for uplink transmission and/or downlink transmission to be scheduled by the first network side device for a target UE or a target cell; a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the first network side device for the target UE or the target cell; a scheduling priority level of a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located.

In a possible embodiment of the present disclosure, the resource represented by the resource information may be a resource configured by the central control unit so as to prevent the occurrence of the intra-UE interference for the target UE or the UE in the target cell.

In a possible embodiment of the present disclosure, the transmission module 902 is further configured to perform the communication transmission with the target UE or the UE in the target cell through the resource represented by the resource information.

In a possible embodiment of the present disclosure, the frequency-domain resource represented by the resource information may include one or more of a PRB, a bandwidth part, a PRB group, a subcarrier, a system bandwidth of a component carrier, and a central frequency point.

In a possible embodiment of the present disclosure, the significant uplink signal may include an uplink reference signal, the significant uplink channel may include one or more of an uplink control channel and a PRACH, the significant downlink signal may include one or more of a synchronization signal, a paging signal and a downlink reference signal, and the significant downlink channel may include one or more of a broadcast channel, a downlink control channel, a downlink shared channel, a PHICH and a PCFICH.

It should be appreciated that, the network side device 900 in the embodiments of the present disclosure may be the first network side device mentioned hereinabove. The implementation of the network side device 900 may refer to that of the first network side device with a same beneficial effect, and thus will not be particularly defined herein.

Figure 10:
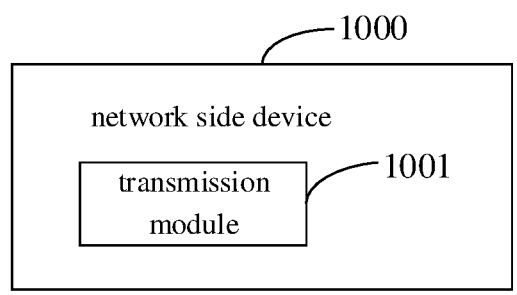
FIG. 10 is another schematic view showing a network side device according to one embodiment of the present disclosure.

As shown in FIG. 10, the present disclosure further provides in some embodiments a network side device which is a second network side device capable of implementing the resource information transmission method in FIG. 7 with a same technical effect. As shown in FIG. 10, the network side device 1000 includes a transmission module 1001 configured to transmit resource information to a first network side device, so that the first network side device performs communication transmission with a UE in accordance with the resource information. The resource information is used to represent a frequency-domain resource for the second network side device.

In a possible embodiment of the present disclosure, the resource information may be used to represent one or more of: a frequency-domain resource for uplink transmission and/or downlink transmission to be scheduled by the second network side device for a target UE or a target cell; a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the second network side device for the target UE or the target cell; a scheduling priority level of a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located; a time-frequency-domain resource occupied by a significant uplink signal and/or a significant uplink channel for the second network side device, the time-frequency-domain resource including a frequency-domain resource and a time-domain resource where the frequency-domain resource is located; and a time-frequency-domain resource occupied by a significant downlink signal and/or a significant downlink channel for the second network side device, the time-frequency-domain resource including a frequency-domain resource and a time-domain resource where the frequency-domain resource is located.

In a possible embodiment of the present disclosure, the frequency-domain resource represented by the resource information may include one or more of a PRB, a bandwidth part, a PRB group, a subcarrier, a system bandwidth of a component carrier, and a central frequency point.

In a possible embodiment of the present disclosure, the significant uplink signal may include an uplink reference signal, the significant uplink channel may include one or more of an uplink control channel and a PRACH, the significant downlink signal may include one or more of a synchronization signal, a paging signal and a downlink reference signal, and the significant downlink channel may include one or more of a broadcast channel, a downlink control channel, a downlink shared channel, a PHICH and a PCFICH.

It should be appreciated that, the network side device 1000 in the embodiments of the present disclosure may be the second network side device mentioned hereinabove. The implementation of the network side device 1000 may refer to that of the second network side device with a same beneficial effect, and thus will not be particularly defined herein.

Figure 11:
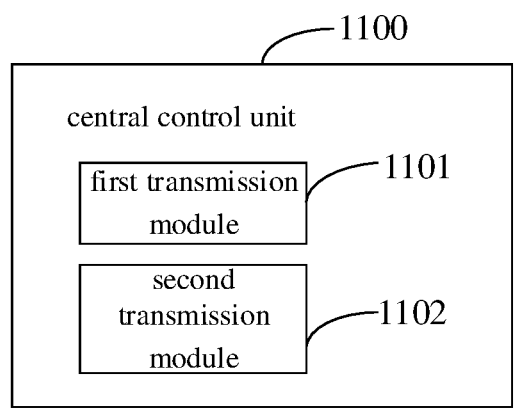
FIG. 11 is a schematic view showing a central control unit according to one embodiment of the present disclosure.

As shown in FIG. 11, the present disclosure further provides in some embodiments a central control unit capable of implementing the resource information transmission method in FIG. 8 with a same technical effect. As shown in FIG. 11, the central control unit 1100 includes: a first transmission module 1101 configured to transmit first resource information to a first network side device, so that the first network side device performs communication transmission with a UE in accordance with the first resource information, the first resource information being used to represent a frequency-domain resource for the first network side device; and a second transmission module 1102 configured to transmit second resource information to a second network side device, so that the second network side device performs communication transmission with the UE in accordance with the second resource information, the second resource information being used to represent a frequency-domain resource for the second network side device.

In a possible embodiment of the present disclosure, the first resource information may be used to represent at least one of: a frequency-domain resource for uplink transmission and/or downlink transmission to be scheduled by the first network side device for a target UE or a target cell; a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the first network side device for the target UE or the target cell; a scheduling priority level of a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located.

In a possible embodiment of the present disclosure, the second resource information may be used to represent at least one of: a frequency-domain resource for uplink transmission and/or downlink transmission to be scheduled by the second network side device for a target UE or a target cell; a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the second network side device for the target UE or the target cell; a scheduling priority level of a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located.

In a possible embodiment of the present disclosure, the resource represented by the first resource information may be a resource configured by the central control unit so as to prevent the occurrence of the intra-UE interference for the target UE or the UE in the target cell, and the resource represented by the second resource information may be a resource configured by the central control unit so as to prevent the occurrence of the intra-UE interference for the target UE or the UE in the target cell.

It should be appreciated that, the central control unit 1100 in the embodiments of the present disclosure may be the central control unit mentioned hereinabove. The implementation of the central control unit 1100 may refer to that of the central control unit with a same beneficial effect, and thus will not be particularly defined herein.

Figure 12:
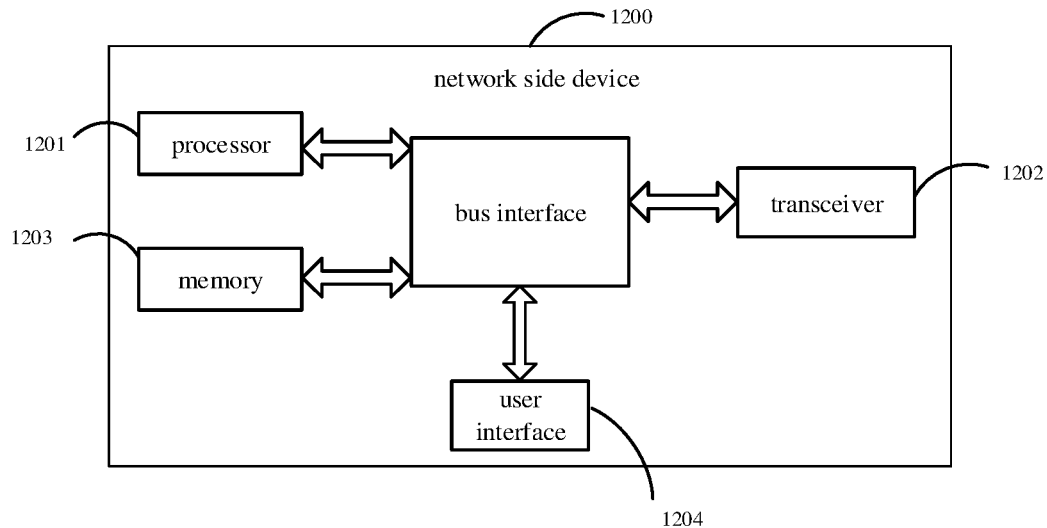
FIG. 12 is another schematic view showing the network side device according to one embodiment of the present disclosure.

As shown in FIG. 12, the present disclosure further provides in some embodiments a network side device which is a first network side device capable of implementing the resource information transmission method in FIGS. 2 to 6 with a same technical effect. As shown in FIG. 12, the network side device 1200 includes a processor 1201, a transceiver 1202, a memory 1203, a user interface 1204 and a bus system. The processor 1201 is configured to read a program stored in the memory 1203, so as to: acquire resource information from a second network side device or a central control unit, the resource information being used to represent a frequency-domain resource for the second network side device or the first network side device; and perform communication transmission with a UE in accordance with the resource information. The transceiver 1202 is configured to receive and transmit data under the control of the processor 1201.

In FIG. 12, bus architecture may include a number of buses and bridges connected to each other, so as to connect various circuits for one or more processors 1201 and one or more memories 1203. In addition, as is known in the art, the bus architecture may be used to connect any other circuits, such as a circuit for a peripheral device, a circuit for a voltage stabilizer and a power management circuit. The bus system may provide an interface, and the transceiver 1202 may consist of a plurality of elements, i.e., a transmitter and a receiver for communication with any other devices over a transmission medium. With respect to different UEs, the user interface 1204 may also be provided for devices which are to be arranged inside or outside the UE, and these devices may include but not limited to a keypad, a display, a speaker, a microphone and a joystick. The processor 1201 may take charge of managing the bus architecture as well as general processings. The memory 1203 may store therein data for the operation of the processor 1201.

In a possible embodiment of the present disclosure, when the resource information is transmitted by the second network side device, the resource information may be used to represent one or more of: a frequency-domain resource for uplink transmission and/or downlink transmission to be scheduled by the second network side device for a target UE or a target cell; a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the second network side device for the target UE or the target cell; a scheduling priority level of a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located; a time-frequency-domain resource occupied by a significant uplink signal and/or a significant uplink channel for the second network side device, the time-frequency-domain resource including a frequency-domain resource and a time-domain resource where the frequency-domain resource is located; and a time-frequency-domain resource occupied by a significant downlink signal and/or a significant downlink channel for the second network side device, the time-frequency-domain resource including a frequency-domain resource and a time-domain resource where the frequency-domain resource is located.

In a possible embodiment of the present disclosure, when performing the communication transmission with the UE in accordance with the resource information, the processor 1201 is further configured to: determine a first transmission resource for the target UE probably influenced by the intra-UE interference in accordance with the resource information, and preferentially schedule a transmission resource other than the first transmission resource so as to perform the communication transmission with the UE; or determine a second transmission resource for the UE in the target cell probably influenced by the intra-UE interference in accordance with the resource information, and preferentially schedule a transmission resource other than the second transmission resource so as to perform the communication transmission with the UE in the target cell.

In a possible embodiment of the present disclosure, the first transmission resource may include one or more of a PRB, a bandwidth part, a PRB group, a subcarrier, a system bandwidth of a component carrier, and a central frequency point, and the second transmission resource may include one or more of a PRB, a bandwidth part, a PRB group, a subcarrier, a system bandwidth of a component carrier, and a central frequency point.

In a possible embodiment of the present disclosure, when the resource information is transmitted by the central control unit, the resource information may be used to represent one or more of: a frequency-domain resource for uplink transmission and/or downlink transmission to be scheduled by the first network side device for a target UE or a target cell; a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the first network side device for the target UE or the target cell; a scheduling priority level of a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located.

In a possible embodiment of the present disclosure, the resource represented by the resource information may be a resource configured by the central control unit so as to prevent the occurrence of the intra-UE interference for the target UE or the UE in the target cell.

In a possible embodiment of the present disclosure, when performing the communication transmission with the UE in accordance with the resource information, the processor 1201 is further configured to perform the communication transmission with the target UE or the UE in the target cell through the resource represented by the resource information.

In a possible embodiment of the present disclosure, the frequency-domain resource represented by the resource information may include one or more of a PRB, a bandwidth part, a PRB group, a subcarrier, a system bandwidth of a component carrier, and a central frequency point.

In a possible embodiment of the present disclosure, the significant uplink signal may include an uplink reference signal, the significant uplink channel may include one or more of an uplink control channel and a PRACH, the significant downlink signal may include one or more of a synchronization signal, a paging signal and a downlink reference signal, and the significant downlink channel may include one or more of a broadcast channel, a downlink control channel, a downlink shared channel, a PHICH and a PCFICH.

It should be appreciated that, the network side device 1200 in the embodiments of the present disclosure may be the first network side device mentioned hereinabove. The implementation of the network side device 1200 may refer to that of the first network side device with a same beneficial effect, and thus will not be particularly defined herein.

Figure 13:
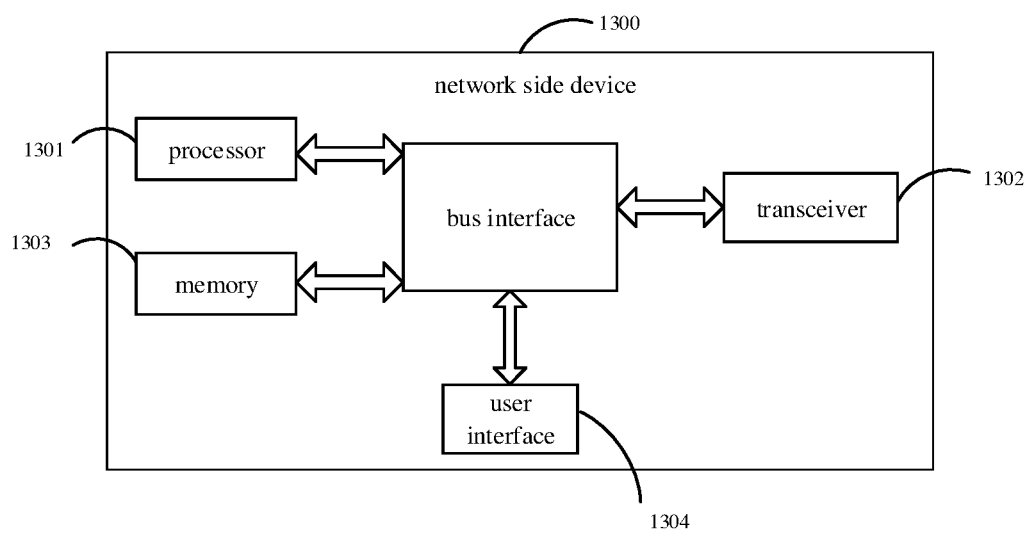
FIG. 13 is yet another schematic view showing the network side device according to one embodiment of the present disclosure.

As shown in FIG. 13, the present disclosure further provides in some embodiments a network side device which is a second network side device capable of implementing the resource information transmission method in FIG. 7 with a same technical effect. As shown in FIG. 13, the network side device 1300 includes a processor 1301, a transceiver 1302, a memory 1303, a user interface 1304 and a bus system. The processor 1301 is configured to read a program stored in the memory 1303, so as to transmit resource information to a first network side device, so that the first network side device performs communication transmission with a UE in accordance with the resource information. The resource information is used to represent a frequency-domain resource for the second network side device. The transceiver 1302 is configured to receive and transmit data under the control of the processor 1301.

In FIG. 13, bus architecture may include a number of buses and bridges connected to each other, so as to connect various circuits for one or more processors 1301 and one or more memories 1303. In addition, as is known in the art, the bus architecture may be used to connect any other circuits, such as a circuit for a peripheral device, a circuit for a voltage stabilizer and a power management circuit. The bus system may provide an interface, and the transceiver 1302 may consist of a plurality of elements, i.e., a transmitter and a receiver for communication with any other devices over a transmission medium. With respect to different UEs, the user interface 1304 may also be provided for devices which are to be arranged inside or outside the UE, and these devices may include but not limited to a keypad, a display, a speaker, a microphone and a joystick. The processor 1301 may take charge of managing the bus architecture as well as general processings. The memory 1303 may store therein data for the operation of the processor 1301.

In a possible embodiment of the present disclosure, the resource information may be used to represent one or more of: a frequency-domain resource for uplink transmission and/or downlink transmission to be scheduled by the second network side device for a target UE or a target cell; a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the second network side device for the target UE or the target cell; a scheduling priority level of a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located; a time-frequency-domain resource occupied by a significant uplink signal and/or a significant uplink channel for the second network side device, the time-frequency-domain resource including a frequency-domain resource and a time-domain resource where the frequency-domain resource is located; and a time-frequency-domain resource occupied by a significant downlink signal and/or a significant downlink channel for the second network side device, the time-frequency-domain resource including a frequency-domain resource and a time-domain resource where the frequency-domain resource is located.

In a possible embodiment of the present disclosure, the frequency-domain resource represented by the resource information may include one or more of a PRB, a bandwidth part, a PRB group, a subcarrier, a system bandwidth of a component carrier, and a central frequency point.

In a possible embodiment of the present disclosure, the significant uplink signal may include an uplink reference signal, the significant uplink channel may include one or more of an uplink control channel and a PRACH, the significant downlink signal may include one or more of a synchronization signal, a paging signal and a downlink reference signal, and the significant downlink channel may include one or more of a broadcast channel, a downlink control channel, a downlink shared channel, a PHICH and a PCFICH.

It should be appreciated that, the network side device 1300 in the embodiments of the present disclosure may be the second network side device mentioned hereinabove. The implementation of the network side device 1300 may refer to that of the second network side device with a same beneficial effect, and thus will not be particularly defined herein.

Figure 14:
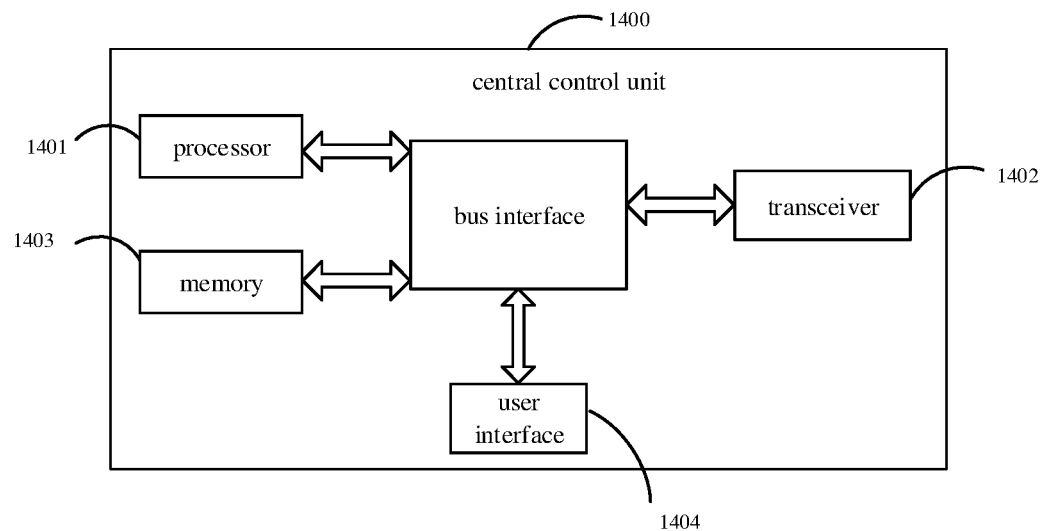
FIG. 14 is another schematic view showing the central control unit according to one embodiment of the present disclosure.

As shown in FIG. 14, the present disclosure further provides in some embodiments a central control unit capable of implementing the resource information transmission method in FIG. 8 with a same technical effect. As shown in FIG. 14, the central control unit 1400 includes a processor 1401, a transceiver 1402, a memory 1403, a user interface 1404 and a bus system. The processor 1401 is configured to read a program stored in the memory 1403, so as to: transmit first resource information to a first network side device, so that the first network side device performs communication transmission with a UE in accordance with the first resource information, the first resource information being used to represent a frequency-domain resource for the first network side device; and transmit second resource information to a second network side device, so that the second network side device performs communication transmission with the UE in accordance with the second resource information, the second resource information being used to represent a frequency-domain resource for the second network side device. The transceiver 1402 is configured to receive and transmit data under the control of the processor 1401.

In FIG. 14, bus architecture may include a number of buses and bridges connected to each other, so as to connect various circuits for one or more processors 1401 and one or more memories 1403. In addition, as is known in the art, the bus architecture may be used to connect any other circuits, such as a circuit for a peripheral device, a circuit for a voltage stabilizer and a power management circuit. The bus system may provide an interface, and the transceiver 1402 may consist of a plurality of elements, i.e., a transmitter and a receiver for communication with any other devices over a transmission medium. With respect to different UEs, the user interface 1404 may also be provided for devices which are to be arranged inside or outside the UE, and these devices may include but not limited to a keypad, a display, a speaker, a microphone and a joystick. The processor 1401 may take charge of managing the bus architecture as well as general processings. The memory 1403 may store therein data for the operation of the processor 1401.

In a possible embodiment of the present disclosure, the first resource information may be used to represent at least one of: a frequency-domain resource for uplink transmission and/or downlink transmission to be scheduled by the first network side device for a target UE or a target cell; a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the first network side device for the target UE or the target cell; a scheduling priority level of a time-frequency-domain resource for the uplink transmission and/or the downlink transmission to be scheduled by the first network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the first network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located.

In a possible embodiment of the present disclosure, the second resource information may be used to represent at least one of: a frequency-domain resource for uplink transmission and/or downlink transmission to be scheduled by the second network side device for a target UE or a target cell; a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a scheduling priority level of a frequency-domain resource for the uplink transmission and/or the downlink transmission to be scheduled by the second network side device for the target UE or the target cell; a scheduling priority level of a time-frequency-domain resource for the uplink transmission and/or the downlink transmission to be scheduled by the second network side device for the target UE or the target cell, the time-frequency-domain resource including a frequency-domain resource and a time-domain resource where the frequency-domain resource is located; a frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the frequency-domain resource; a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency-domain resource, the time-frequency-domain resource including a frequency-domain resource and a time-domain resource where the frequency-domain resource is located.

In a possible embodiment of the present disclosure, the resource represented by the first resource information may be a resource configured by the central control unit so as to prevent the occurrence of the intra-UE interference for the target UE or the UE in the target cell, and the resource represented by the second resource information may be a resource configured by the central control unit so as to prevent the occurrence of the intra-UE interference for the target UE or the UE in the target cell.

It should be appreciated that, the central control unit 1400 in the embodiments of the present disclosure may be the central control unit mentioned hereinabove. The implementation of the central control unit 1400 may refer to that of the central control unit with a same beneficial effect, and thus will not be particularly defined herein.

Figure 15:
FIG. 15 is a schematic view showing a resource information transmission system according to one embodiment of the present disclosure.

The present disclosure further provides in some embodiments a resource information transmission system which, as shown in FIG. 15, includes a first network side device 1501 and a second network side device 1502. The first network side device 1501 and the second network side device 1502 may be those mentioned hereinabove, and thus will not be particularly defined herein.

Figure 16:
FIG. 16 is another schematic view showing the resource information transmission system according to one embodiment of the present disclosure.

The present disclosure further provides in some embodiments a resource information transmission system which, as shown in FIG. 16, includes a first network side device 1601 and a central control unit 1602. The first network side device 1601 and the central control unit 1602 may be those mentioned hereinabove, and thus will not be particularly defined herein.

The present disclosure further provides in some embodiments a computer-readable storage medium storing therein a resource information transmission program. The resource information transmission program is executed by a processor so as to implement the above-mentioned resource information transmission method for the first network side device.

The present disclosure further provides in some embodiments a computer-readable storage medium storing therein a resource information transmission program. The resource information transmission program is executed by a processor so as to implement the above-mentioned resource information transmission method for the second network side device.

The present disclosure provides in some embodiments a computer-readable storage medium storing therein a resource information transmission program. The resource information transmission program is executed by a processor so as to implement the above-mentioned resource information transmission method for the central control unit.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A resource information transmission method applied in a first network side device, comprising:
   acquiring resource information from a second network side device, the resource information comprising PRBs for uplink transmission and/or downlink transmission to be scheduled by the second network side device, wherein the first network side device is one of a LTE eNB and a NR gNB, and the second network side device is another one of the LTE eNB and the NR gNB; and
   performing communication transmission with a User Equipment (UE) in accordance with the resource information;
   wherein the performing communication transmission with a User Equipment (UE) in accordance with the resource information comprises:
   not performing the uplink transmission and the downlink transmission simultaneously, when uplink transmission is performed between the second network side device and the UE;
   wherein the resource information is used to indicate one or more of:
   a frequency-domain resource for the uplink transmission and/or the downlink transmission to be scheduled by the second network side device for a target UE or a target cell, as well as transmission power, a transmission power range, a transmission power spectrum density or a transmission power spectrum density range corresponding to the frequency-domain resource;
   a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency- domain resource, the time-frequency-domain resource comprising a frequency-domain resource and a time-domain resource where the frequency-domain resource is located.

2. The resource information transmission method according to claim 1, wherein the resource information is further used to indicate one or more of:
   a scheduling priority level of a frequency-domain resource for the uplink transmission and/or the downlink transmission to be scheduled by the second network side device for a target UE or a target cell;
a scheduling priority level of a time-frequency-domain resource for the uplink transmission and/or the downlink transmission to be scheduled by the second network side device for the target UE or the target cell, the time-frequency-domain resource comprising a frequency-domain resource and a time-domain resource where the frequency-domain resource is located;
a time-frequency-domain resource occupied by a significant uplink signal and/or a significant uplink channel for the second network side device, the time-frequency-domain resource comprising a frequency-domain resource and a time-domain resource where the frequency-domain resource is located; and
a time-frequency-domain resource occupied by a significant downlink signal and/or a significant downlink channel for the second network side device, the time-frequency-domain resource comprising a frequency-domain resource and a time-domain resource where the frequency-domain resource is located.

3. The resource information transmission method according to claim 2, wherein the performing the communication transmission with the UE in accordance with the resource information comprises:
determining a first transmission resource for the target UE probably influenced by an intra-UE interference in accordance with the resource information, and preferentially scheduling a transmission resource other than the first transmission resource so as to perform the communication transmission with the UE, wherein the determining the first transmission resource for the target UE probably influenced by the intra-UE interference in accordance with the resource information comprises: determining whether the frequency point information about the target UE is within a frequency range in combination with an LTE uplink frequency point, a 5G NR uplink frequency point, an LTE system bandwidth and a central frequency point at the network side; or
determining a second transmission resource for the UE in the target cell probably influenced by the intra-UE interference in accordance with the resource information, and preferentially scheduling a transmission resource other than the second transmission resource so as to perform the communication transmission with the UE in the target cell, wherein the determining the second transmission resource for the target UE probably influenced by the intra-UE interference in accordance with the resource information comprises: determining whether the frequency point information about the target UE is within a frequency range in combination with an LTE uplink frequency point, a 5G NR uplink frequency point, an LTE system bandwidth and a central frequency point at the network side.

4. The resource information transmission method according to claim 3, wherein the first transmission resource comprises one or more of a Physical Resource Block (PRB), a bandwidth part, a PRB group, a subcarrier, a system bandwidth of a component carrier, and a central frequency point, and the second transmission resource comprises one or more of a PRB, a bandwidth part, a PRB group, a subcarrier, a system bandwidth of a component carrier, and a central frequency point.

5. The resource information transmission method according to claim 2, wherein the frequency-domain resource indicated by the resource information further comprises one or more of a bandwidth part, a PRB group, a subcarrier, a system bandwidth of a component carrier, and a central frequency point.

6. The resource information transmission method according to claim 2, wherein the significant uplink signal comprises an uplink reference signal, the significant uplink channel comprises one or more of an uplink control channel and a Physical Random Access Channel (PRACH), the significant downlink signal comprises one or more of a synchronization signal, a paging signal and a downlink reference signal, and the significant downlink channel comprises one or more of a broadcast channel, a downlink control channel, a downlink shared channel, a Physical Hybrid Automatic Repeat-reQuest Indicator Channel (PHICH) and a Physical Control Format Indicator Channel (PCFICH).

7. A resource information transmission method applied in a second network side device, comprising:
transmitting resource information to a first network side device, so that the first network side device performs communication transmission with a UE in accordance with the resource information,
wherein the resource information comprises PRBs for uplink transmission and/or downlink transmission to be scheduled by the second network side;
wherein the first network side device is one of a LTE eNB and a NR gNB, and the second network side device is another one of the LTE eNB and the NR gNB device;
after transmitting resource information to the first network side device, the method further comprises:
the first network side device does not perform the uplink transmission and the downlink transmission simultaneously, when uplink transmission is performed between the second network side device and the UE;
wherein the resource information is used to indicate one or more of:
a frequency-domain resource for the uplink transmission and/or the downlink transmission to be scheduled by the second network side device for a target UE or a target cell, as well as transmission power, a transmission power range, a transmission power spectrum density or a transmission power spectrum density range corresponding to the frequency-domain resource;
a time-frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the time-frequency-domain resource, the time-frequency-domain resource comprising a frequency-domain resource and a time-domain resource where the frequency-domain resource is located.

8. The resource information transmission method according to claim 7, wherein the resource information is further used to indicate one or more of:
a scheduling priority level of a frequency-domain resource for the uplink transmission and/or the downlink transmission to be scheduled by the second network side device for a target UE or a target cell;
a scheduling priority level of a time-frequency-domain resource for the uplink transmission and/or the downlink transmission to be scheduled by the second network side device for the target UE or the target cell, the time-frequency-domain resource comprising a frequency-domain resource and a time-domain resource where the frequency-domain resource is located;

a time-frequency-domain resource occupied by a significant uplink signal and/or a significant uplink channel for the second network side device, the time-frequency-domain resource comprising a frequency-domain resource and a time-domain resource where the frequency-domain resource is located; and a time-frequency-domain resource occupied by a significant downlink signal and/or a significant downlink channel for the second network side device, the time-frequency-domain resource comprising a frequency-domain resource and a time-domain resource where the frequency-domain resource is located.

9. The resource information transmission method according to claim 8, wherein the frequency-domain resource indicated by the resource information further comprises one or more of a bandwidth part, a PRB group, a subcarrier, a system bandwidth of a component carrier, and a central frequency point.

10. The resource information transmission method according to claim 8, wherein the significant uplink signal comprises an uplink reference signal, the significant uplink channel comprises one or more of an uplink control channel and a PRACH, the significant downlink signal comprises one or more of a synchronization signal, a paging signal and a downlink reference signal, and the significant downlink channel comprises one or more of a broadcast channel, a downlink control channel, a downlink shared channel, a PHICH and a PCFICH.

11. A network side device, wherein the network side device is a first network side device, the first network side device comprises a processor, a memory, a transceiver and a user interface, wherein the processor, the memory, the transceiver and the user interface are coupled together via a bus system, and the processor is configured to read a program stored in the memory so as to implement the resource information transmission method, the method comprises:

acquiring resource information from a second network side device, the resource information comprising PRBs for uplink transmission and/or downlink transmission to be scheduled by the second network side device, wherein the first network side device is one of a LTE eNB and a NR gNB, and the second network side device is another one of the LTE eNB and the NR gNB; and performing communication transmission with a User Equipment (UE) in accordance with the resource information;

wherein the performing communication transmission with a User Equipment (UE) in accordance with the resource information comprises:

not performing the uplink transmission and the downlink transmission simultaneously, when uplink transmission is performed between the second network side device and the UE;

wherein the resource information is used to indicate one or more of:

a frequency-domain resource for the uplink transmission and/or the downlink transmission to be scheduled by the second network side device for the target UE or the target cell, as well as transmission power, a transmission power range, a transmission power spectrum density or a transmission power spectrum density range corresponding to the frequency-domain resource;

a time-frequency-domain resource for the uplink transmission and/or the downlink transmission to be scheduled by the second network side device for a target UE or a target cell, as well as transmission power, a transmission power range, a transmission power spectrum density or a transmission power spectrum density range corresponding to the time-frequency-domain resource, the time-frequency-domain resource comprising a frequency-domain resource and a time-domain resource where the frequency-domain resource is located.

12. The network side device according to claim 11, wherein the resource information is further used to indicate one or more of:

a scheduling priority level of a frequency-domain resource for the uplink transmission and/or the downlink transmission to be scheduled by the second network side device for a target UE or a target cell;

a scheduling priority level of a time-frequency-domain resource for the uplink transmission and/or the downlink transmission to be scheduled by the second network side device for the target UE or the target cell, the time-frequency-domain resource comprising a frequency-domain resource and a time-domain resource where the frequency-domain resource is located;

a time-frequency-domain resource occupied by a significant uplink signal and/or a significant uplink channel for the second network side device, the time-frequency-domain resource comprising a frequency-domain resource and a time-domain resource where the frequency-domain resource is located; and a time-frequency-domain resource occupied by a significant downlink signal and/or a significant downlink channel for the second network side device, the time-frequency-domain resource comprising a frequency-domain resource and a time-domain resource where the frequency-domain resource is located.

13. The network side device according to claim 12, wherein the performing the communication transmission with the UE in accordance with the resource information comprises:

determining a first transmission resource for the target UE probably influenced by an intra-UE interference in accordance with the resource information, and preferentially scheduling a transmission resource other than the first transmission resource so as to perform the communication transmission with the UE, wherein the determining the first transmission resource for the target UE probably influenced by the intra-UE interference in accordance with the resource information comprises: determining whether the frequency point information about the target UE is within a frequency range in combination with an LTE uplink frequency point, a 5G NR uplink frequency point, an LTE system bandwidth and a central frequency point at the network side; or determining a second transmission resource for the UE in the target cell probably influenced by the intra-UE interference in accordance with the resource information, and preferentially scheduling a transmission resource other than the second transmission resource so as to perform the communication transmission with the UE in the target cell, wherein the determining the second transmission resource for the target UE probably influenced by the intra-UE interference in accordance with the resource information comprises: determining whether the frequency point information about the target UE is within a frequency range in combination with an LTE uplink frequency point, a 5G NR uplink frequency point, an LTE system bandwidth and a central frequency point at the network side.

14. The network side device according to claim 13, wherein the first transmission resource comprises one or more of a Physical Resource Block (PRB), a bandwidth part, a PRB group, a subcarrier, a system bandwidth of a component carrier, and a central frequency point, and the second transmission resource comprises one or more of a PRB, a bandwidth part, a PRB group, a subcarrier, a system bandwidth of a component carrier, and a central frequency point.

15. The network side device according to claim 12, wherein the frequency-domain resource indicated by the resource information further comprises one or more of a bandwidth part, a PRB group, a subcarrier, a system bandwidth of a component carrier, and a central frequency point.

16. The network side device according to claim 12, wherein the significant uplink signal comprises an uplink reference signal, the significant uplink channel comprises one or more of an uplink control channel and a Physical Random Access Channel (PRACH), the significant downlink signal comprises one or more of a synchronization signal, a paging signal and a downlink reference signal, and the significant downlink channel comprises one or more of a broadcast channel, a downlink control channel, a downlink shared channel, a Physical Hybrid Automatic Repeat-reQuest Indicator Channel (PHICH) and a Physical Control Format Indicator Channel (PCFICH).

* * * * *